United States Patent [19]

Iesato et al.

[11] Patent Number: 4,970,769

[45] Date of Patent: Nov. 20, 1990

[54] METHOD FOR PRODUCING CYLINDER HAVING SCAVENGING PASSAGES FOR TWO-CYCLE INTERNAL COMBUSTION ENGINE

[75] Inventors: Hiroshi Iesato, Yokohama; Kazuyuki Nishiwaki, Miura; Kazumasa Okano, Ome; Isao Masuda, Tachikawa; Akira Sageshima, Kunitachi; Minoru Yonekawa, Hachioji, all of Japan

[73] Assignee: Kioritz Corporation, Tokyo, Japan

[21] Appl. No.: 339,739

[22] Filed: Apr. 18, 1989

[30] Foreign Application Priority Data

Apr. 26, 1988 [JP] Japan ................................ 63-102945

[51] Int. Cl.$^5$ ................................................ B23P 15/08

[52] U.S. Cl. .......................... 29/888.061; 123/73 AA

[58] Field of Search .................... 29/15.4 WL; 164/98, 164/113; 123/73 AA

[56] References Cited

U.S. PATENT DOCUMENTS

| | | | |
|---|---|---|---|
| 1,955,292 | 4/1934 | Heintz | 29/156.4 WL |
| 3,073,290 | 1/1963 | Stump | 29/156.4 WL |
| 3,257,998 | 6/1966 | Brooks | 123/73 AA |
| 3,808,955 | 5/1974 | Hamada et al. | 29/156.4 WL X |
| 3,851,631 | 12/1974 | Kiekhaefer | 123/73 A |
| 4,446,906 | 5/1984 | Ackerman et al. | 164/112 |
| 4,700,444 | 10/1987 | Yamagata | 29/156.44 WL |
| 4,738,298 | 4/1988 | Taruno et al. | 164/97 |
| 4,766,944 | 8/1988 | Sakuma et al. | 164/97 |

FOREIGN PATENT DOCUMENTS

| | | | |
|---|---|---|---|
| 1198500 | 2/1964 | Fed. Rep. of Germany . | |
| 2003871 | 1/1970 | Fed. Rep. of Germany . | |
| 47-20963 | 12/1972 | Japan . | |
| 151713 | 11/1979 | Japan | 29/156.4 WL |
| 43233 | 3/1980 | Japan | 29/156.4 WL |
| 16767 | 1/1983 | Japan | 164/98 |
| 40663 | 3/1985 | Japan | 164/98 |
| 137548 | 7/1985 | Japan | 164/98 |
| 148658 | 8/1985 | Japan | 164/98 |
| 8400995 | 3/1984 | PCT Int'l Appl. | 123/73 AA |
| 891751 | 3/1962 | United Kingdom | 29/156.4 WL |

*Primary Examiner*—Timothy V. Eley
*Assistant Examiner*—Frances Chin
*Attorney, Agent, or Firm*—Browdy and Neimark

[57] ABSTRACT

A method for manufacturing a cylinder having scavenging passages for a two-cycle internal combustion engine is disclosed which comprises the steps of forming bulged portions protruded radially outwardly in a portion of a cylindrical liner, and surrounding the liner by casting through a high pressure diecast method, thereby form a main part of the cylinder.

2 Claims, 1 Drawing Sheet

METHOD FOR PRODUCING CYLINDER HAVING SCAVENGING PASSAGES FOR TWO-CYCLE INTERNAL COMBUSTION ENGINE

BACKGROUND OF THE INVENTION

1. Field of the Invention

The present invention relates to a method for producing a cylinder having scavenging passages for two-cycle internal combustion engine.

2. The Prior Art

In a cylinder having scavenging passages for a two-cycle internal combustion engine, scavenging passages are formed in a peripheral wall of the cylinder for feeding scavenging mixture precompressed within a crank case into the cylinder. In general, the scavenging passages are formed integrally in a C-shaped crosssection in the longitudinal or axial direction in a wall of the cylinder. Conventionally, such a cylinder has been produced by using a gravity casting method or a low pressure casing method by using a lost core. It has been impossible to produce such a cylinder through a high pressure die-casting method. Also, in the case where the cylinder should be formed through the high pressure die-casting method, it is necessary to use a metal bore core that has an intricate split die configuration. As a result, the manufacturing cost for the cylinder would be increased, and the manufacturing efficiency would be low.

SUMMARY OF THE INVENTION

Accordingly, an object of the invention is to provide a method for producing a cylinder having scavenging passages for a two-cycle internal combustion engine, which may overcome the above-noted defects inherent in the prior art cylinder and which is simple in structure and is convenient to use.

Namely, a method for producing a cylinder having scavenging passages for a two-cycle internal combustion engine according to the present invention is characterized in that scavenging passages bulged radially outwardly are formed in a portion of a cylindrical liner, and the liner is surrounded by casting through a high pressure die-casting method to form a main part of the cylinder.

Accordingly, the bulged portion of the liner forms a scavenging passage in the cylinder. It is possible to produce a cylinder having the scavenging passage, through the high pressure die-casting method in low cost with a high efficiency without any need to use the inner core. In addition, the material for the liner may be selectively used in conformity with the condition of use.

DESCRIPTION OF THE PREFERRED EMBODIMENTS

The present invention will now be described by way of example with reference to the accompanying drawings.

Figure 1:
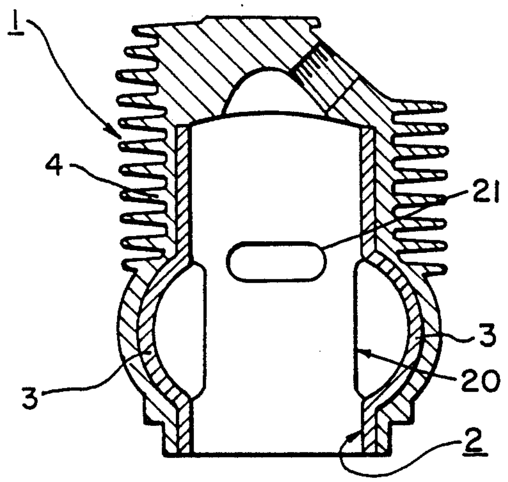
FIG. 1 is a longitudinal sectional view showing a cylinder having scavenging passages for a two-cycle internal combustion engine in accordance with an embodiment of the invention.

In an embodiment shown in FIG. 1, for producing a cylinder 1, a cylindrical liner 2 which has been provided with an intake port 20 and an exhaust port 21 in advance is first prepared. The liner 2 may be formed of aluminum alloy, high silicon aluminum alloy, sintered metal, iron and any other suitable material. One or more bulged portions 3 are bulged radially outwardly a C-shaped in cross-section in the longitudinal or axial direction through a bulge working in the liner 2. In this embodiment, the two bulged portions 3 are provided so as to face each other in a diametrically opposite relation with respect to the liner 2.

The liner 2 that has been thus provided with the bulged portions 3 in advance is disposed in place in a high pressure diecast machine. The liner 2 is surrounded by casting with aluminum alloy through the high pressure die-casting method. As a result, the cylinder main part 4 of aluminum alloy is formed. The liner 2 and the cylinder main part 4 are integrally bonded with each other to form the cylinder 1.

The thus produced cylinder 1 is provided with a piston (not shown) being slidable in the liner 2, when the cylinder 1 is assembled into the two-cycle internal combustion engine. As a result, the bulged portions 3 of the liner 2 form non-partitioned scavenging passages between the bulged portions 3 and the piston.

Figure 2:
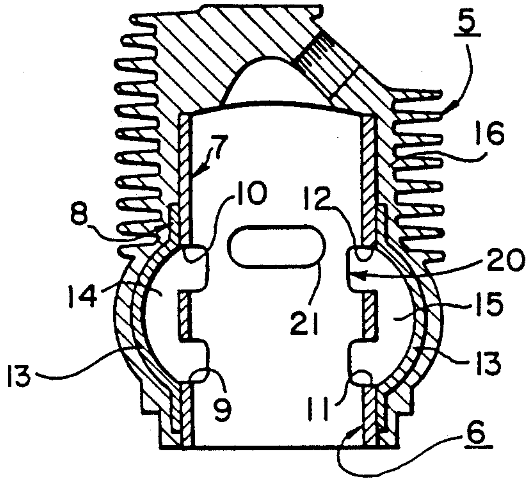
FIG. 2 is a longitudinal sectional view showing a cylinder in accordance with another embodiment of the invention.

In an other embodiment shown in FIG. 2, first of all, a liner 6 is provided for manufacturing a cylinder 5. The liner 6 is composed of a main cylindrical liner portion 7 and a subliner portion 8 to be mounted on an outer peripheral surface of the main liner portion 7 as described later. Two pairs of holes 9 and 10 and holes 11 and 12 which are separated in the axial direction are formed at diametrically opposite locations of the main liner portion 7. The subliner portion 8 is provided with a pair of bulged portions 13 projected radially outwardly in the form of C-shaped in cross section in the axial direction by the bulge working. The subliner portion 8 is bonded to the outer peripheral surface of the main liner portion 7 by suitable bonding means such as fit-pressing so as to cover the parts of the main liner portion 7 in which the holes 9, 10, 11 and 12 are formed. In the respective bulged portions 13, a passage 14 in communication with the holes 9 and 10 on one side and a passage 15 in communication with the holes 11 and 12 on the other side are formed between the two liner portions 7 and 8. The above-described liner portions 7 and 8 are made of suitable material such as aluminum alloy, high silicon aluminum alloy, sintered metal, and iron.

The thus produced liner 6 is disposed in a high diecast machine. The liner 6 is surrounded by aluminum alloy through the high pressure diecast method, to thereby form a cylinder main portion 16 made of aluminum alloy. As a result, the liner 6 and the main cylinder portion 16 are bonded integrally with each other to form a cylinder 5.

The thus formed cylinder 5 is assembled in a two-cycle internal combustion engine with a piston (not shown) being slidably mounted with in the liner portion 7. The passages 14 and 15 between the two liner portions 7 and 8 serve as partitioned scavenging passages.

We claim:

1. A method for manufacturing a cylinder having scavenging passages for two-cycle internal combustion engine, comprising the steps of:

first preparing a cylindrical liner formed or suitable material provided with an intake port and exhaust port;

then forming bulged portions protruded radially outwardly in a portion of said cylindrical liner; and then surrounding said cylindrical liner by casting through a high pressure diecast method, to thereby form a main part of the cylinder integrally bonded with said cylindrical liner.

2. The method according to claim 1, wherein said cylindrical liner is composed of a cylindrical main liner portion and a subliner portion in which formed are scavenging passages as bulged portion portions which are protruded radially outwardly and mounted on the outer peripheral surface of the main liner portion in which holes are formed.

* * * * *